Patented Jan. 4, 1944

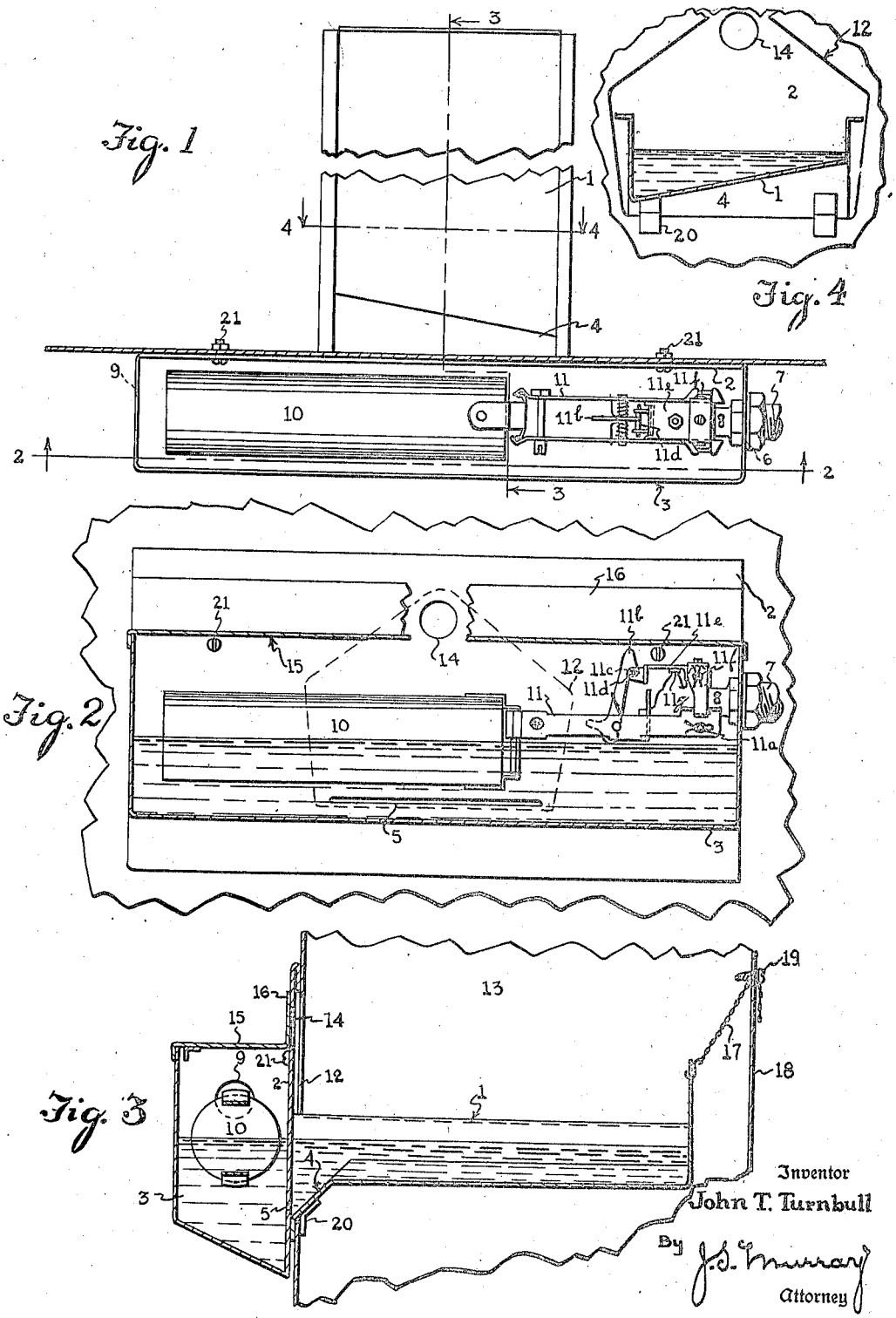

2,338,144

UNITED STATES PATENT OFFICE 2,338,144

FURNACE HUMIDIFIER

John T. Turnbull, Detroit, Mich.

Application September 26, 1940, Serial No. 358,483

3 Claims. (Cl. 126—113)

This invention relates to furnace humidifiers and particularly to humidifiers maintaining a substantially constant liquid level for evaporation purposes.

As heretofore constructed, constant level humidifiers for furnaces have either located a float-operated valve directly in the evaporating pan or in a chamber entirely separate from said pan and having a pipe connection thereto. Deposits of lime and sediment produced by evaporation render location of any level control means in the evaporating pan decidedly objectionable. A separate float chamber decreases the objection aforementioned, if safeguarded against undue evaporation, but said deposits eventually clog any pipe connection leading to the evaporating pan. Also provision of a float chamber separate from the pan adds difficulty to installation and fails to assure disposal of the pan and chamber at correct relative levels.

An object of the present invention is to combine the evaporator pan and float chamber of a furnace humidifier in a single unit positively disposing them at correct relative levels, and to connect them by an opening permitting ready removal of lime or other deposits, while resisting heat transfer to the float chamber by water diffusion.

Another object is to provide an evaporator pan for furnace humidifying, affording a very simple regulation of liquid surface area exposed to air.

Other objects are to provide for convenient inspection of the evaporator pan and to provide a support for the inner end of such pan affording a convenient adjustment to properly level the pan.

These and various other objects the invention attains by the construction hereinafter described and illustrated in the accompanying drawing, wherein:

Fig. 1 is a top plan view of the humidifier in operative relation to a furnace.

Fig. 2 is a vertical sectional view taken on the line 2—2 of Fig. 1, particularly showing the float-controlled valve.

Fig. 3 is a vertical sectional view of the same, taken on the line 3—3 of Fig. 1.

Fig. 4 is a cross-sectional view of the evaporating pan taken upon the line 4—4 of Fig. 1.

In these views, the reference character 1 designates an elongated, open-topped evaporator pan carried and closed at one end thereof by a wall 2 of a relatively deep, open-topped float chamber 3. Said chamber is preferably elongated transversely to the pan 1, a permanent interconnection between the two being established by welding or in some other suitable manner. A portion 4 of the pan 1 adjacent to the chamber 3 is downwardly inclined toward said chamber at a suitable angle, as for example forty-five degrees, and just above the lower edge of such portion, a substantially horizontally slot 5 in the wall 2 extends substantially the full width of the pan, forming a water inlet to the latter from the chamber 3 and permitting the same water level in the chamber and pan. The pan bottom is at an elevation above that of the chamber, as the latter must have a depth exceeding that of the pan to accommodate float-operated mechanism, and preferably said pan is transversely inclined for a purpose which will presently appear.

Water is delivered into the float chamber through an opening 6 in an end wall thereof by a pipe 7 controlled within said chamber by a valve 8, and an emergency overflow opening 9 is formed in the other end wall of the chamber. By forming the openings 6 and 9 of equal size and locating them oppositely, either may accommodate the pipe 7, the other serving an overflow purpose. Said valve and the illustrated mechanism for controlling it through a float 10 are of ordinary construction well known in this art. The mechanism shown comprises an arm 11 pivoted at one end on the valve body, as indicated at 11a, and rigidly carrying the float at its other end. Pivoted upon and upstanding from the mid portion of said arm is a detent 11b having a cam shoulder 11c which in the limiting raised position of the float engages a pin 11d on one end of a plate 11e pivoted at its other end as indicated at 11f. Said plate carries a closure 11g for the upwardly directed outlet of the valve. Upon a slight predetermined lowering of the float, the detent 11b slips clear on the pin 11d, allowing the plate 11e with said closure to rise slightly to admit additional water. It is usual to adapt the float for vertical adjustment on the arm to afford variation of the limiting positions in which the float takes effect.

The wall 2 forms a panel for closing an opening 12 through which the pan 1 projects into the plenum chamber 13 of a furnace. Said wall preferably has its upper portion extending some distance above the top of float chamber and in said portion is formed an opening 14 which in conjunction with the opening 12 permits observation of the liquid level in the pan. It is preferred to close the chamber 3 by a removable cover 15 which has a vertical extension 16 serving to normally provide a closure for the opening 14.

Since the pan 1 is considerably elongated, it is preferred to extend a supporting chain 17 from the rear end of said pan upwardly and through the rear wall 18 of the plenum chamber, said chain being clamped at any desired point of its length by a screw 19. Thus the effective length of the chain may be readily regulated to permit accurate leveling of the pan.

To facilitate and expedite installation of the humidifier, it is preferred to attach a pair of clips 20 by welding or otherwise to the bottom face of the portion 4 of the pan, such clips coacting with the plate 2 to straddle the lower edge of the opening 12. In conjunction with fasteners 21 securing the upper portion of the plate 2 to the plenum chamber, said clips adapt the humidifier to be readily installed or removed.

By transversely inclining the bottom of the pan 1, as best appears in Fig. 4, raising or lowering of the water level in the pan through regulation of the float in a well-known manner, adapts the water to cover all or a desired portion of the pan bottom. Thus the area of liquid exposed to evaporation may be readily regulated. There is a material advantage in obtaining this regulation by a transverse rather than a longitudinal inclination of the pan, as a longitudinal inclination would tend, on decreasing the surface area of the water, to deprive air adjacent the inner end of the pan of all humidity.

When the humidifier is installed as described, the correct relative levels of the pan and float chamber are definitely assured. By opening the slot 5 into the lower portion of the depression formed by the inclination 4 of the pan bottom, said slot and depression jointly form a trap such as will afford a free flow of water to the pan from the float chamber, while resisting any diffusion transfer of warm water from the pan to the float chamber. The elongated nature of the opening formed by said slot tends to retard clogging of such opening by deposits, the primary advantage of the construction being, however, its adaptability for ready removal from both faces of the wall 2 of any deposits. The unitary construction of the pan and float chamber lends itself to a low manufacturing cost as well as to easy installation, and renders the humidifier readily adaptable to practically any type of hot air furnace.

That portion of the float chamber below the level of the slot 5 serves to receive any sediment precipitating in said chamber, and assures that the slot will not be restricted or clogged by such sediment. Inclination of the float chamber bottom tends to deflect sediment toward the wall 2 and away from the mid portion of the bottom. Thus when the float is in fully lowered position and resting on the bottom, it will have no tendency to pick up sediment and acquire undue weight.

The invention is presented as including all such changes and modifications as come within the scope of the following claims.

What I claim is:

1. A furnace humidifier comprising an evaporating pan and a float chamber having a common wall and such wall having an opening adjacent to the pan bottom placing the pan and chamber in communication, said wall being extended above the float chamber and formed with an opening to afford observation of the liquid level in the pan, and a cover removably carried by said chamber having an upstanding portion for normally closing said opening.

2. A furnace humidifier comprising a unit forming an evaporating pan and a float chamber of a depth materially exceeding that of the pan, said unit having a partition between the pan and chamber and the pan being formed with a depression at said partition, the partition having an opening into the lower portion of the depression, whereby said opening affords delivery of water from the float chamber to the pan, and a material convection transfer of heat in a reverse direction is avoided.

3. A furnace humidifier as set forth in claim 2, said depression being approximately coextensive with the width of the pan and said opening being a slot elongated substantially transversely of the pan.

JOHN T. TURNBULL.